US009071766B2

(12) United States Patent
Kodama

(10) Patent No.: US 9,071,766 B2
(45) Date of Patent: Jun. 30, 2015

(54) IMAGE CAPTURING APPARATUS AND CONTROL METHOD THEREOF

(71) Applicant: CANON KABUSHIKI KAISHA, Tokyo (JP)

(72) Inventor: Yasunobu Kodama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 14/108,798

(22) Filed: Dec. 17, 2013

(65) Prior Publication Data

US 2014/0176754 A1   Jun. 26, 2014

(30) Foreign Application Priority Data

Dec. 21, 2012   (JP) ................................. 2012-280065

(51) Int. Cl.
*H04N 5/353* (2011.01)
*H04N 5/235* (2006.01)

(52) U.S. Cl.
CPC ........... *H04N 5/2356* (2013.01); *H04N 5/2353* (2013.01)

(58) Field of Classification Search
CPC .............................. H04N 5/2353; H04N 5/353
USPC ........................ 348/239, 222.1, 362, 264, 265
See application file for complete search history.

(56) References Cited

U.S. PATENT DOCUMENTS

| 7,426,341 | B2 * | 9/2008 | Misawa ........................ 396/226 |
| 8,125,535 | B2 * | 2/2012 | Onoda et al. ................ 348/229.1 |
| 2006/0044444 | A1 * | 3/2006 | Okamoto et al. ......... 348/333.05 |

FOREIGN PATENT DOCUMENTS

JP   2006-157348 A   6/2006

* cited by examiner

*Primary Examiner* — Tuan Ho
(74) *Attorney, Agent, or Firm* — Carter, DeLuca, Farrell & Schmidt, LLP

(57) ABSTRACT

An image capturing apparatus comprises a photometry unit which detects a luminance of an object; a determining unit which determines, based on a result of photometry at a first exposure, whether to perform autoexposure bracketing that captures a plurality of images at different exposures; a calculating unit which calculates an exposure change amount that is different from the first exposure used when performing the autoexposure bracketing; a correcting unit which corrects the calculated exposure change amount based on a result of photometry at a second exposure that is different from the first exposure; and a shooting control unit which shoots an image at the exposure change amount calculated by the calculating unit or the exposure change amount corrected by the correcting unit.

14 Claims, 6 Drawing Sheets

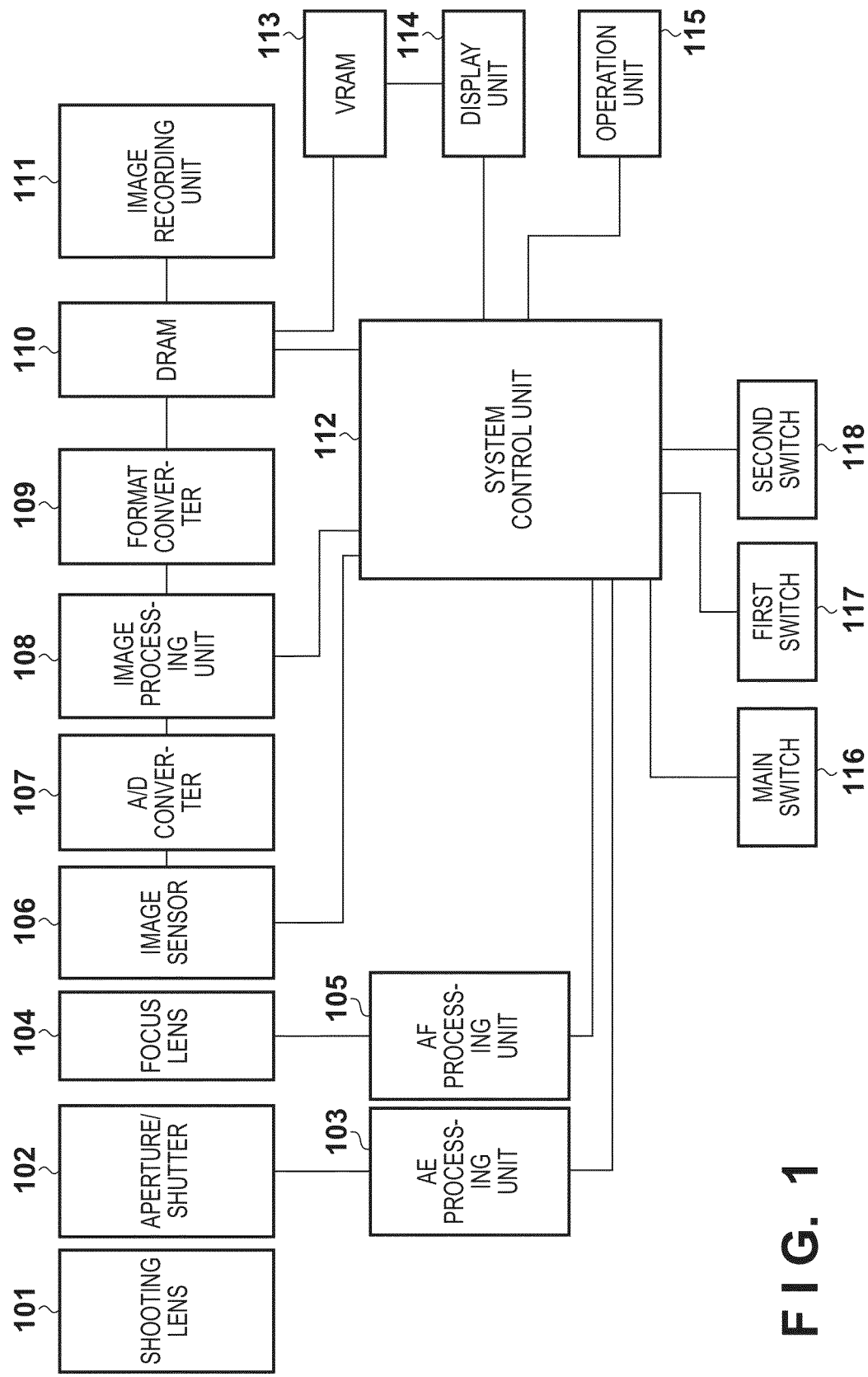
F I G. 1

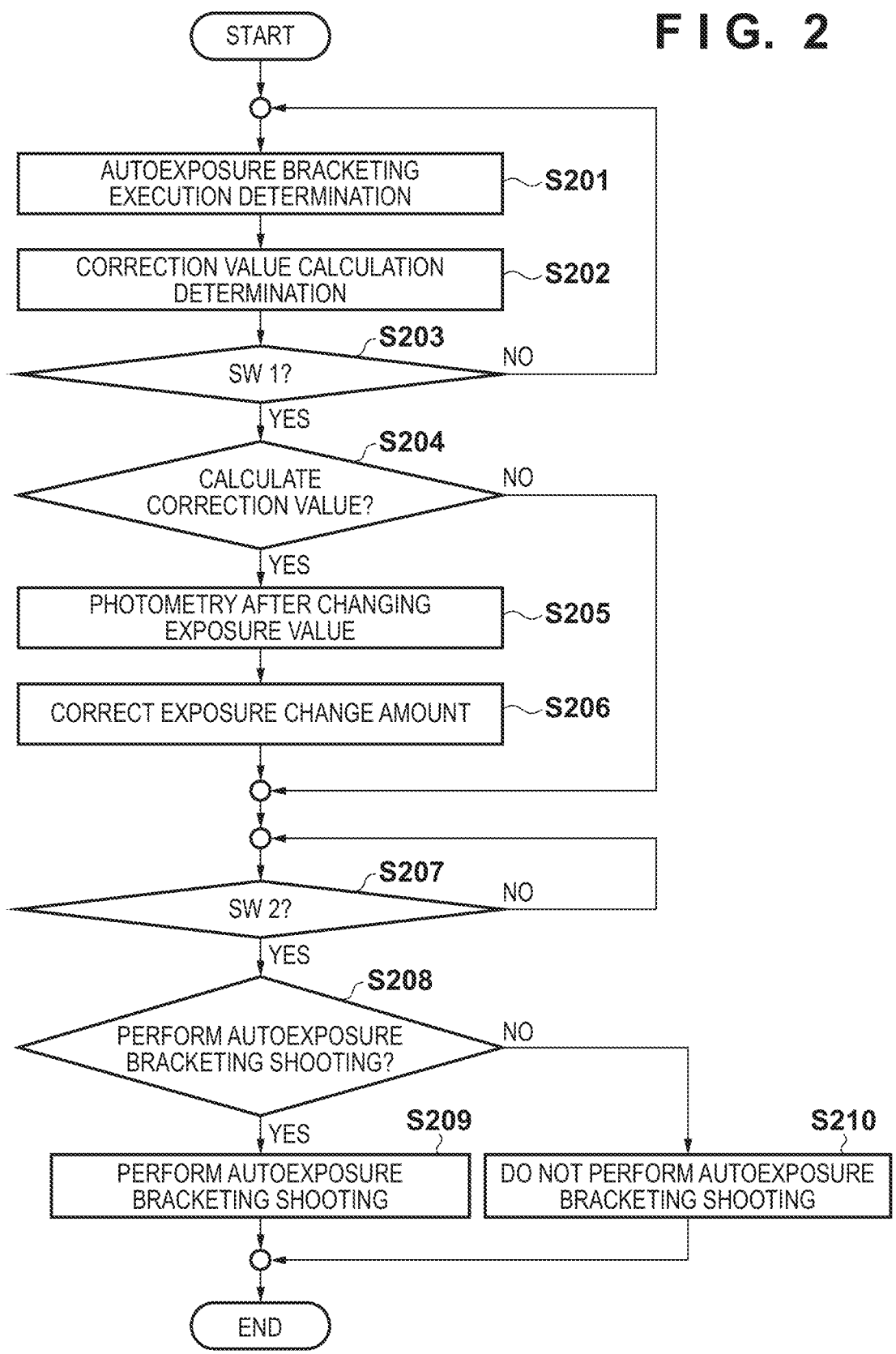

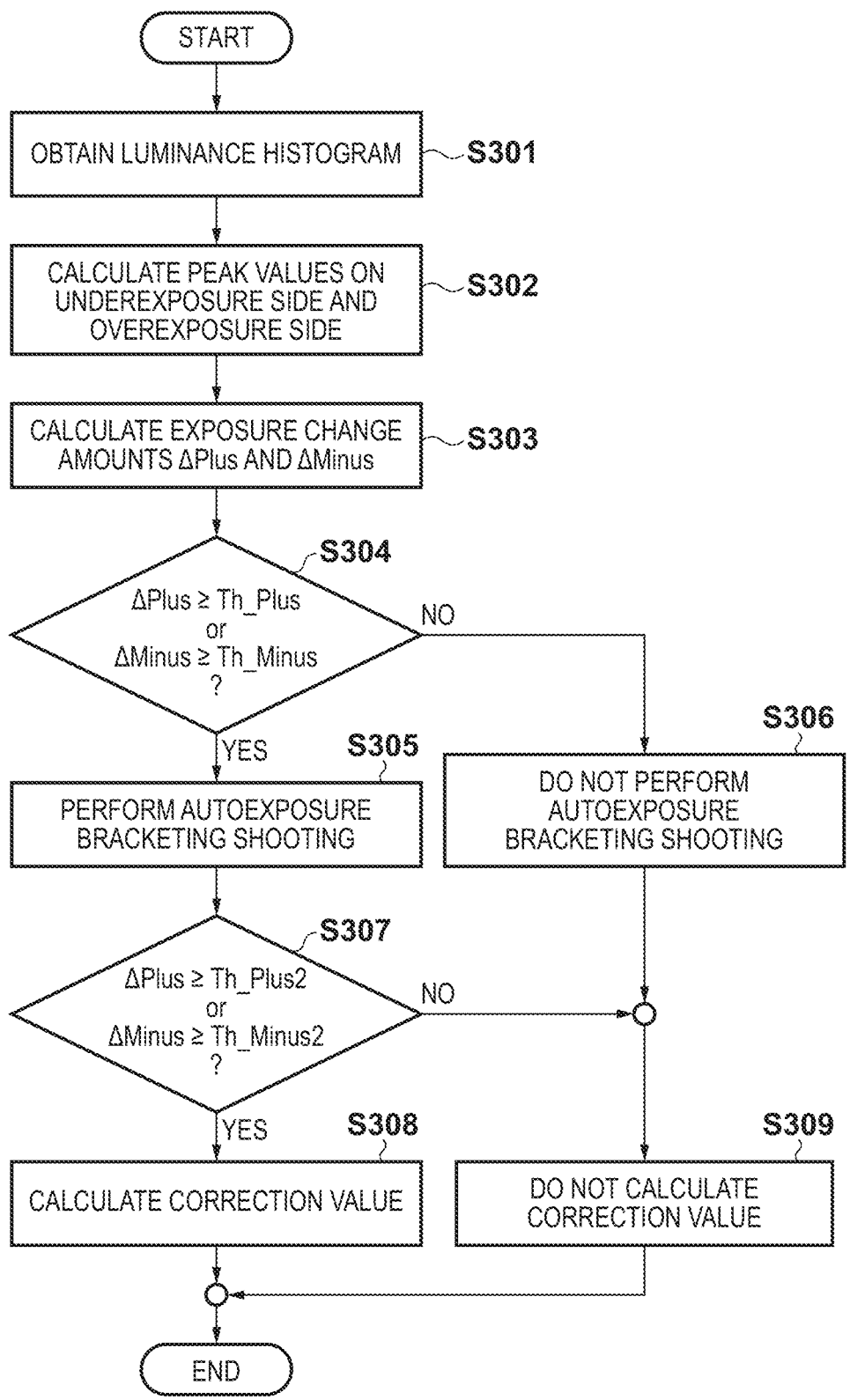

Y(m, n)

ΔPlus
Y_Low  Y_Ref

ΔPlus2
Y_Low2  Y_Low

IMAGE CAPTURING APPARATUS AND CONTROL METHOD THEREOF

BACKGROUND OF THE INVENTION

1. Field of the Invention

The present invention relates to an image capturing apparatus and control method thereof, and particularly relates to shooting techniques for shooting a plurality of images at different exposures.

2. Description of the Related Art

Autoexposure bracketing functions, in which a plurality of images are shot at different exposures than a correct exposure, have been known for some time. One merit of such functions is that underexposed or overexposed images are also shot, and thus even if highlight-detail loss or shadow-detail loss is present in a shot scene, images in which such highlight-detail loss or shadow-detail loss is suppressed can nevertheless be obtained. Furthermore, methods for automatically calculating exposure correction amounts and shooting images at pre- and post-correction exposure values in order to reduce highlight-detail loss and shadow-detail loss in shot scenes are also known.

With respect to such functions, Japanese Patent Laid-Open No. 2006-157348, for example, discloses a method that calculates a luminance histogram of an image, determines whether or not overexposed or underexposed regions are present, calculates an exposure correction value based on a result of the determination, and shoots an image anew. Japanese Patent Laid-Open No. 2006-157348 also discloses a method that sets a plurality of exposure correction value candidates and selects an image having an optimal exposure correction value from images shot at each of the exposure correction values.

However, with the techniques disclosed in Japanese Patent Laid-Open No. 2006-157348, it is necessary for a user to select an optimal exposure correction value from among many exposure correction value candidates, which can result in an increase in time lag when shooting, an increase in the amount of memory used, and so on.

SUMMARY OF THE INVENTION

The present invention has been made in consideration of the aforementioned problems, and realizes a technique that enables an optimal exposure value for a shot scene to be calculated when shooting a plurality of images at different exposures.

In order to solve the aforementioned problems, the present invention provides an image capturing apparatus comprising: a photometry unit configured to detect a luminance of an object; a determining unit configured to determine, based on a result of photometry at a first exposure, whether to perform autoexposure bracketing that captures a plurality of images at different exposures; a calculating unit configured to calculate an exposure change amount that is different from the first exposure used when performing the autoexposure bracketing; a correcting unit configured to correct the calculated exposure change amount based on a result of photometry at a second exposure that is different from the first exposure; and a shooting control unit configured to shoot an image at the exposure change amount calculated by the calculating unit or the exposure change amount corrected by the correcting unit.

In order to solve the aforementioned problems, the present invention provides a control method of an image capturing apparatus which captures an image of an object, the method comprising: a photometry step of detecting a luminance of the object; a determining step of determining, based on a result of photometry at a first exposure, whether to perform autoexposure bracketing that captures a plurality of images at different exposures; a calculating step of calculating an exposure change amount that is different from the first exposure used when performing the autoexposure bracketing; a correcting step of correcting the calculated exposure change amount based on a result of photometry at a second exposure that is different from the first exposure; and a shooting control step of shooting an image at the exposure change amount calculated in the calculating step or the exposure change amount corrected in the correcting step.

According to the present invention, it is possible to calculate an optimal exposure value for a shot scene when shooting a plurality of images at different exposures.

Further features of the present invention will become apparent from the following description of exemplary embodiments (with reference to the attached drawings).

BRIEF DESCRIPTION OF THE DRAWINGS

FIG. 1 is a block diagram illustrating the configuration of an image capturing apparatus according to an embodiment of the present invention.

FIG. 2 is a flowchart illustrating shooting operations performed by the image capturing apparatus according to the embodiment.

FIG. 3 is a flowchart illustrating an autoexposure bracketing execution determination process and a correction value calculation determination process indicated in FIG. 2.

DESCRIPTION OF THE EMBODIMENTS

Figure 4A:
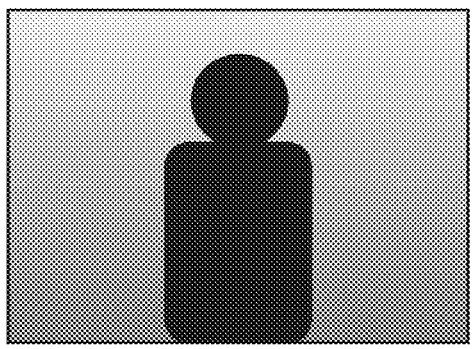
FIGS. 4A to 4E are diagrams illustrating an exposure change amount calculation method in the autoexposure bracketing execution determination process indicated in FIG. 2.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Hereinafter, descriptions will be given of an embodiment in which the present invention is applied in an image capturing apparatus, such as a digital camera, that has an autoexposure bracketing function for shooting a plurality of images at exposures that are different from a correct exposure.

Apparatus Configuration

An overview of the configuration and functions of an image capturing apparatus 100 according to an embodiment of the present invention will be given with reference to FIG. 1.

In FIG. 1, a shooting lens 101 includes a zoom mechanism. An aperture/shutter 102 controls the amount of reflected light of the object, corresponding to an optical image, that is incident on an image sensor 106, and a charge accumulation time, based on operational instructions from an AE (autoexposure) processing unit 103. The AE processing unit 103 controls operations of the aperture/shutter 102, and also controls operations of an A/D converter 107. A focus lens 104 forms the optical image on a light-receiving surface of the image sensor 106 in focus, in accordance with a control signal from an AF (autofocus) processing unit 105.

The image sensor 106 converts the optical image formed on the light-receiving surface into an electrical signal using a photoelectric conversion element such as a CCD, a CMOS, or the like, and outputs the electrical signal to the A/D converter 107. The A/D converter 107 converts an analog signal input from the image sensor 106 into a digital signal. The A/D converter 107 also includes a CDS circuit that removes noise from the analog signal, a nonlinear amplifying circuit for amplifying the analog signal in a nonlinear manner before the analog signal is converted into the digital signal, and so on.

An image processing unit 108 outputs image data by performing predetermined pixel interpolation, resizing processes such as image reduction, color conversion processing, and so on the digital signal output from the A/D converter 107. A format converter 109 coverts the format of the image data generated by the image processing unit 108 in order to store the image data in a DRAM 110. The DRAM 110 is an example of a high-speed internal memory, and is used as a high-speed buffer for temporarily storing image data, a working memory for compressing/decompressing image data, or the like.

An image recording unit 111 includes a recording medium such as a memory card for recording shot images (still images and moving images), and an interface for the recording medium. A system control unit 112 includes a CPU, a ROM, and a RAM, and the overall operation of the apparatus is controlled by the CPU loading programs stored in the ROM into a working area of the RAM and executing those programs. The system control unit 112 also carries out control for selecting a charge accumulation control mode to be used from among a plurality of such modes employed by the image sensor 106. A VRAM 113 is a memory for image display. A display unit 114 is an LCD or the like, and displays images, operational assistance screens, and statuses of the camera, as well as displaying a shooting screen and a distance measurement area when shooting an image.

A user operates the apparatus from the exterior by manipulating an operation unit 115. The operation unit 115 includes, for example, a menu switch for setting exposure correction values, aperture values, making various types of settings such as settings during image reproduction, and so on, a zoom lever for instructing the shooting lens to perform zoom operations, a mode toggle switch for toggling between a shooting mode and a reproduction mode, and so on. A main switch 116 is a switch for turning the system on. A first switch 117 outputs a first switch signal SW1 to the system control unit 112, and is a switch for performing shooting preparation operations such as AE processing, AF processing, and so on. A second switch 118 outputs a second switch signal SW2 to the system control unit 112 after the first switch 117 has been operated (that is, after the first switch signal SW1 has been output), and is a switch for instructing shooting to be performed.

Shooting Operations

Next, shooting operations performed by the image capturing apparatus according to the present embodiment will be described with reference to FIG. 2. Note that the shooting control processing shown in FIG. 2 is realized by the CPU of the system control unit 112 loading programs stored in the ROM into a working area of the RAM and executing those programs.

In step S201, the system control unit 112 performs an autoexposure bracketing execution determination process and calculates an exposure change amount used during autoexposure bracketing shooting, in a period until the first switch signal SW1 resulting from the first switch 117 being manipulated has been detected. The autoexposure bracketing execution determination method and the exposure change amount calculation method are examples of methods that analyze a luminance histogram of a through-the-lens image displayed in the display unit 114, and details thereof will be given later with reference to FIG. 3. Meanwhile, with digital cameras and the like that have object detection functions for detecting an object region, such as the face of a person, in a shot image, it may be determined whether or not to perform autoexposure bracketing shooting based on the magnitude of a luminance value in the object region.

In step S202, the system control unit 112 determines whether or not to calculate a correction value for the exposure change amount, after the autoexposure bracketing execution determination process of step S201. As an example of this correction value calculation determination process, the correction value is calculated from data obtained by performing photometry anew at a different exposure value than that used in the autoexposure bracketing execution determination process in step S201. In addition to determining whether or not to calculate the correction value, an exposure value used during photometry is also calculated in this correction value calculation determination process. Details of the correction value calculation method will be described later with reference to FIG. 3.

In step S203, the system control unit 112 determines whether the first switch 117 has been manipulated and the first switch signal SW1 has been detected. The process advances to step S204 in the case where the first switch signal SW1 has been detected, and returns to step S201 in the case where the first switch signal SW1 has not been detected, where the autoexposure bracketing execution determination process (S201) and the correction value calculation determination process (S202) are repeated.

In step S204, the system control unit 112 advances the process to step S205 in the case where a result of the correction value calculation determination process of step S202 indicates that the correction value is to be calculated, and advances the process to step S207 in the case where the correction value is not to be calculated. Note that in this flowchart, the determination processes of steps S201 and S202 are performed prior to the first switch signal SW1 being detected in order to reduce the time from when the first switch signal SW1 is detected to when the autoexposure bracketing shooting is performed. However, the autoexposure bracketing execution determination process and the correction value calculation determination process may be carried out once again from when the first switch signal SW1 is detected to when step S204 is carried out in the case where the shooting scene has been switched due to shooting preparation operations performed in response to the first switch signal SW1.

In step S205, the system control unit 112 has determined in step S204 that the correction value is to be calculated, and thus carries out photometry at a different exposure than that used in the autoexposure bracketing execution determination process.

In step S206, the system control unit 112 calculates an exposure change amount correction value based on a result of the photometry in step S205, and corrects the exposure change amount. This exposure change amount correction process will be described in detail later with reference to FIG. 5.

In step S207, the system control unit 112 stands by until the second switch 118 is manipulated and the second switch signal SW2 is detected. The process advances to step S208 in the case where the second switch signal SW2 has been detected.

In step S208, based on a result of the autoexposure bracketing execution determination process carried out in step S201, the system control unit 112 advances the process to step S209 in the case where autoexposure bracketing shooting is to be performed, and advances the process to step S210 in the case where autoexposure bracketing shooting is not to be performed.

In step S209, the system control unit 112 performs the autoexposure bracketing shooting at the exposure change amount finalized in the processing carried out up to step S206.

In step S210, the system control unit 112 carries out control so that autoexposure bracketing shooting is not performed. In the case where the autoexposure bracketing shooting is not to be performed, a single shot is taken at the exposure value calculated in the autoexposure bracketing execution determination process in step S201; however, non-exposure bracketing, in which a series of shots are taken as the same exposure value or at varying focal positions, may be carried out as an alternative shooting method.

Autoexposure Bracketing Execution Determination Process and Correction Value Calculation Determination Process Next, the autoexposure bracketing execution determination process (S201) and the correction value calculation determination process (S202) indicated in FIG. 2 will be described with reference to FIG. 3.

The following describes an example of bracketing in which a single image is shot at a correct exposure as well as at a higher exposure and a lower exposure than the correct exposure, for a total of three images being shot; however, the number of images shot is not limited to three, and may be a number greater or less than three.

Figure 4B:
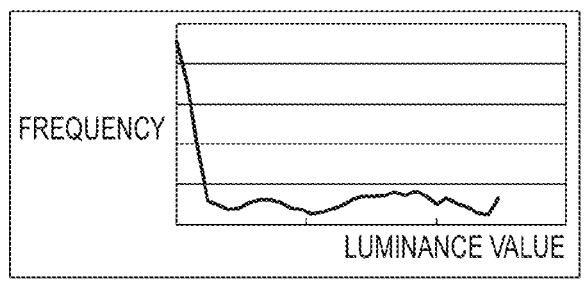

In step S301 of FIG. 3, the system control unit 112 obtains a luminance histogram for the image to be shot. Luminance values Y (m, n) (where m=0 to M−1 and n=0 to N−1) in an image of M×N blocks are used to calculate the luminance histogram. FIGS. 4A and 4B illustrate an example of an image of a given scene and a luminance histogram of that image. In FIG. 4B, the horizontal axis represents a luminance value, whereas the vertical axis represents the frequency with which each luminance value appears in the M×N blocks. The luminance values are assumed to be within a range of Y (m, n)=0 to Y_Max.

Note that the exposure value of the image used when obtaining this luminance histogram (called a "reference exposure" hereinafter) is found as described below.

Using a photometry weight W (m, n) (m=0 to M−1 and n=0 to N−1), a luminance histogram is obtained using an image having an exposure value in which a luminance value Y_All of the overall image, calculated as (ΣY(m, n)×W(m, n))/ ΣW(m, n) (where Σ is calculated as the sum of m=0 to M−1 and n=0 to N−1) matches a predetermined value Y_Ref. The system control unit 112 performs AE processing, the aforementioned computational processes, and so on while controlling the aperture/shutter and sensitivity prior to the first switch signal SW1 being detected in order to achieve the stated exposure value. Here, the photometry weight W (m, n) is a greater value in locations closer to the center of the image, for example. Note also that although the scales of m and n are assumed here to be the same when obtaining the luminance histogram and when calculating the reference exposure, different scales may be used in the respective situations. For example, a luminance value of each pixel may be used when obtaining the luminance histogram, whereas a luminance value for each of blocks obtained by taking a plurality of pixels as a block may be used when calculating the reference exposure.

Figure 4C:
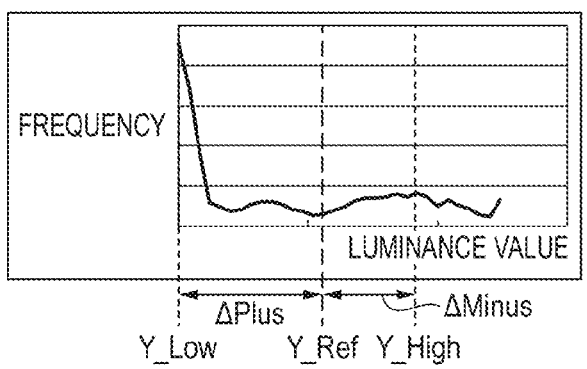

In step S302, the system control unit 112 calculates peak values for an underexposure side and an overexposure side of the histogram. FIG. 4C illustrates an example of the respective peaks on the underexposure side and the overexposure side of the luminance histogram. The luminance value indicated by the central broken line is taken as Y_Ref. As a method for calculating the peak values, luminance values in the highest-frequency areas on a lower luminance side of Y_Ref (to the left of the broken line) and on a higher luminance side of Y_Ref (to the right of the broken line) are calculated as Y_Low and Y_High.

In step S303, the system control unit 112 calculates exposure change amounts ΔPlus and ΔMinus for autoexposure bracketing shooting using the Y_Low and Y_High calculated in step S302. The exposure change amounts are calculated through the following formulas.

$$\Delta Plus = \log_2(Y\_Ref/Y\_Low)$$

$$\Delta Minus = \log_2(Y\_High/Y\_Ref)$$

In step S304, the system control unit 112 determines whether the values of the exposure change amounts ΔPlus and ΔMinus calculated in step S303 are greater than or equal to respective predetermined first thresholds Th_Plus and Th_Minus. In the case where the determination indicates that at least one of the exposure change amounts ΔPlus and ΔMinus is greater than or equal to the corresponding predetermined first threshold, the process advances to step S305, whereas in the case where at least one of the exposure change amounts ΔPlus and ΔMinus is less than the corresponding predetermined first threshold, the process advances to step S306.

In the case where at least one of the exposure change amounts is greater than or equal to the corresponding predetermined first threshold, the scene is a scene having a large area in which there is shadow-detail loss in the low-luminance region or highlight-detail loss in the high-luminance region, and thus in step S305, the system control unit 112 determines that autoexposure bracketing shooting is to be performed. When performing autoexposure bracketing shooting, a total of three shots are taken, one at the reference exposure, one at a ΔPlus overexposure relative to the reference exposure, and one at a ΔMinus underexposure relative to the reference exposure. In other words, shooting is carried out so that a region having the Y_Low luminance value takes on the Y_Ref luminance value in the overexposure and a region having the Y_High luminance value takes on the Y_Ref luminance value in the underexposure. In the case where the exposure is changed from the reference exposure, shooting is carried out by controlling at least one of the aperture/shutter and the sensitivity.

In the case where at least one of the exposure change amounts is less than the predetermined first threshold, the scene is a scene in which there is no shadow-detail loss in the low-luminance region or no highlight-detail loss in the high-luminance region, or an area of such loss is small, and thus in step S306, the system control unit 112 determines that autoexposure bracketing shooting is not to be performed.

In step S307, in the case where autoexposure bracketing shooting is to be performed, the system control unit 112 determines whether or not to calculate correction values for the exposure change amounts ΔPlus and ΔMinus. Here, the system control unit 112 determines whether the values of the exposure change amounts ΔPlus and ΔMinus are greater than or equal to respective predetermined second thresholds Th_Plus2 and Th_Minus2. In the case where the determination indicates that at least one of the exposure change amounts ΔPlus and ΔMinus is greater than or equal to the corresponding predetermined second threshold, the process advances to step S308, whereas in the case where at least one of the exposure change amounts ΔPlus and ΔMinus is less than the corresponding predetermined second threshold, the process advances to step S309. Note that in this example, it is assumed that Th_Plus2≥Th_Plus and Th_Minus2≥Th_Minus, so that the determination to calculate the correction value is stricter than the determination to perform autoexposure bracketing shooting.

Figure 4D:
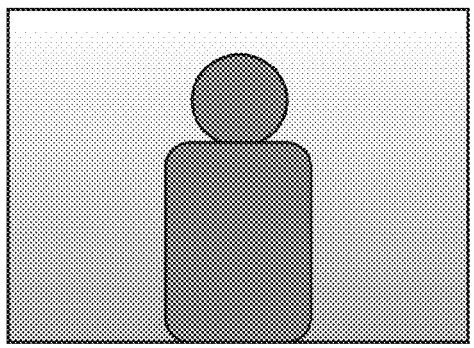
Figure 4E:
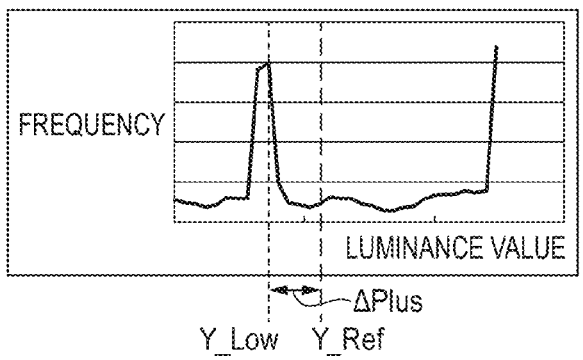

For example, in the case where Y_Low is far from Y_Ref as shown in FIG. 4C, or in other words, in the case where there is shadow-detail loss in the low-luminance region, it is difficult to accurately calculate the difference from Y_Ref. Accordingly, as one correction value calculation method, obtaining the luminance histogram at an exposure that suppresses shadow-detail loss and highlight-detail loss in the underexposure side and overexposure side peaks makes it possible to calculate a more accurate exposure change amount. FIGS. 4D and 4E illustrate an image of a scene having a higher luminance value than the scene in FIG. 4A, and a luminance histogram for the scene in FIG. 4D. Comparing Y_Low in FIG. 4E with Y_Low in FIG. 4C, it can be seen that the luminance value is higher, and there is no shadow-detail loss, in FIG. 4E. The exposure change amount correction values are calculated using a luminance histogram such as that shown in FIG. 4E.

In step S308, the system control unit 112 determines to calculate the correction values for the exposure change amounts.

In step S309, the system control unit 112 determines not to calculate the correction values for the exposure change amounts.

Correction Value Calculation Process

Next, a process for calculating the exposure change amount correction value during autoexposure bracketing shooting will be described with reference to FIG. 5, using the calculation of ΔPlus as an example. A purpose of calculating the correction value is that, in the case where the autoexposure bracketing shooting is performed at an underexposure where the peak of the low-luminance region is at a desired luminance value, the degree to which the image is then overexposed can be calculated accurately even in the case where the luminance value in the low-luminance region is extremely low.

Figure 5:
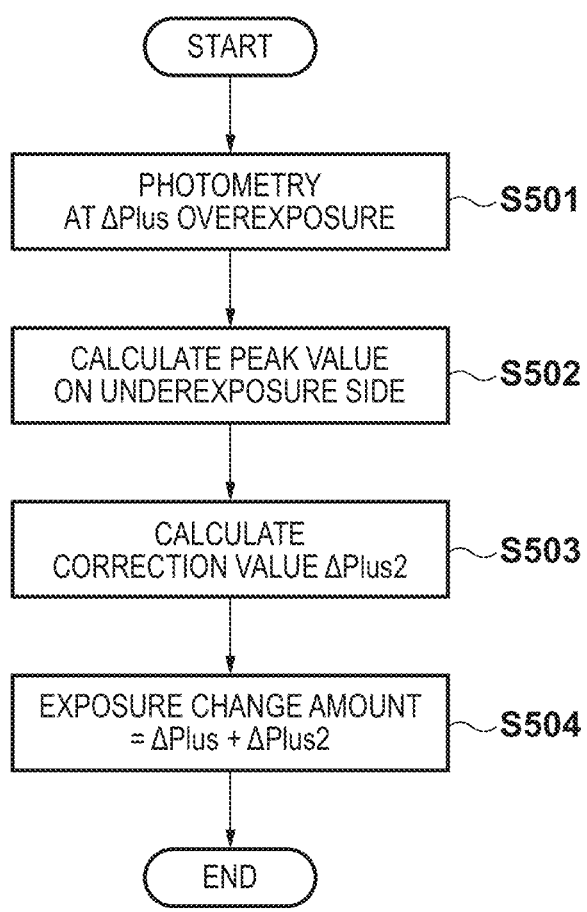
FIG. 5 is a flowchart illustrating an exposure change amount correction process indicated in FIG. 2.
Figure 6A:
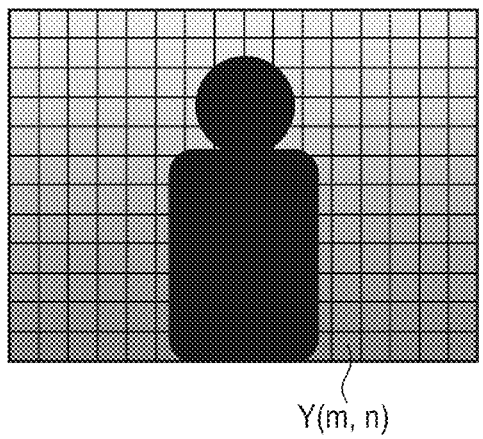
FIGS. 6A to 6D are diagrams illustrating a correction value calculation method in the exposure change amount correction process indicated in FIG. 2.
Figure 6B:
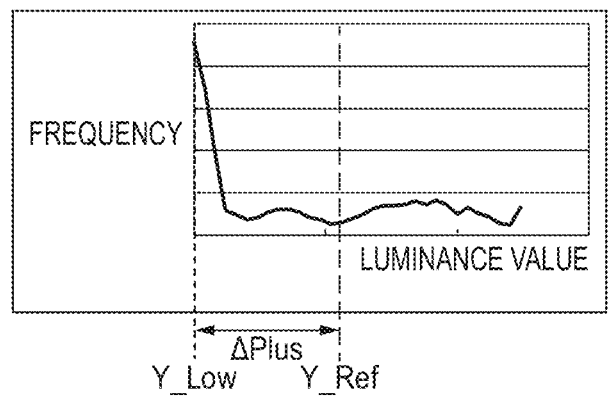
Figure 6C:
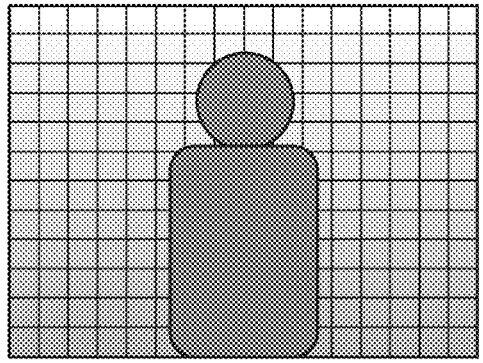
Figure 6D:
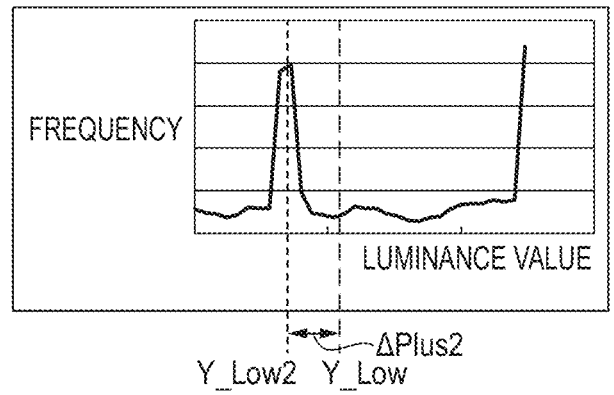

In step S501 of FIG. 5, the system control unit 112 carries out photometry at an exposure that is ΔPlus over the reference exposure, so that the luminance value in the low-luminance region rises. By setting the exposure to be ΔPlus over, a luminance value that was less than or equal to Y_Low at the reference exposure approaches Y_Ref, and thus shadow-detail loss is suppressed. FIGS. 6A and 6B illustrate an image of a scene metered at the reference exposure and a luminance histogram thereof, whereas FIGS. 6C and 6D illustrate an image of a scene metered at ΔPlus overexposure and a luminance histogram thereof. Looking at the luminance histogram in FIG. 6B, it can be seen that the histogram has a greater frequency at the left end of the low-luminance side. On the other hand, looking at the luminance histogram in FIG. 6D, it can be seen that the luminance value distribution in FIG. 6B has changed so as to approach Y_Ref.

Note that the photometry based on the overexposure is performed after the first switch signal SW1 has been detected, as indicated in FIG. 2; however, when photometry is performed at an overexposure, an image at a different exposure will be temporarily displayed in the through-the-lens image displayed in the display unit 114 of the camera, imparting an unnatural sense. Accordingly, updating of the through-the-lens image displayed in the display unit 114 may temporarily be stopped in the case where the photometry is based on exposures aside from the reference exposure.

Meanwhile, when there is a significant change in the angle of view between FIG. 6A and FIG. 6C, the two scenes are considered to be different scenes, and thus it may be difficult to calculate an appropriate correction value. Accordingly, in the case where there is a means for detecting movement of the apparatus itself or movement in the object within the image, control may be carried out so that the correction value is calculated only in the case where it has been determined that there is no movement of the apparatus itself or in the object within the image. Note that determining movement using a gyrosensor can be given as an example of a method for detecting movement in the apparatus itself. Calculating the sum of luminance differences between corresponding pixels in two images and making a determination based on the magnitude of those values can be given as an example of a method for detecting movement of the object within the image.

In step S502, the system control unit 112 calculates a peak value on the underexposure side of the luminance histogram obtained from the scene metered at the ΔPlus overexposure. The same method as that indicated in step S302 may be used to calculate the peak value. This peak value is taken as Y_Low2.

In step S503, the system control unit 112 calculates a correction value ΔPlus2 for the exposure change amount used in the autoexposure bracketing shooting through the following formula, using the Y_Low2 calculated in step S502 and Y_Low.

$$\Delta Plus2 = \log_2(Y\_Low/Y\_Low2)$$

In step S504, using the pre-correction exposure change amount ΔPlus and the correction value ΔPlus2, the system control unit 112 calculates the exposure change amount (ΔPlus+ΔPlus2) for the autoexposure bracketing shooting.

The correction value for the exposure change amount used during autoexposure bracketing shooting can be calculated through this method.

Although the present embodiment uses a luminance histogram to calculate the correction value for the exposure change amount as well, it should be noted that the position of the low-luminance region in the image may be calculated and the correction value may then be calculated using a luminance value in the same position as that used during the photometry taken at overexposure. For example, a method may be employed where the image is divided into M×N blocks, and the luminance values for each block and a luminance histogram of the image are then calculated. Next, when luminance values less than or equal to the luminance value Y_Low at the low-luminance side of the luminance histogram are taken as the low-luminance region and a flag indicating the low-luminance region is taken as fLow (m, n) (m=0 to M−1 and n=0 to N−1), fLow (m, n) is TRUE when Y (m, n)≤Y_Low and is FALSE when such is not the case. Then, the luminance values of each of the M×N blocks in the overexposed image are calculated, an average luminance value is calculated for the blocks where fLow (m, n)=TRUE, and that average luminance value is taken as Y_Low2.

Furthermore, although the present embodiment describes setting the exposure to overexposure and analyzing the luminance information of the low-luminance region in order to calculate the ΔPlus correction value, the exposure may be set to underexposure and the luminance information of the high-luminance region may be analyzed in order to calculate the ΔMinus correction value.

According to the present embodiment as described thus far, when performing autoexposure bracketing shooting, an exposure change amount having an optimal value can be calculated based on the shot scene, and thus it is possible to suppress an increase in time lag when shooting, an increase in the amount of memory used, and so on.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-280065, filed Dec. 21, 2012, which is hereby incorporated by reference herein in its entirety.

What is claimed is:

1. An image capturing apparatus comprising:
   a photometry unit configured to detect a luminance of an object;
   a determining unit configured to determine, based on a result of photometry at a first exposure, whether to perform autoexposure bracketing that captures a plurality of images at different exposures;
   a calculating unit configured to calculate an exposure change amount that is different from the first exposure used when performing the autoexposure bracketing;
   a correcting unit configured to correct the calculated exposure change amount based on a result of photometry at a second exposure that is different from the first exposure; and
   a shooting control unit configured to shoot an image at the exposure change amount calculated by the calculating unit or the exposure change amount corrected by the correcting unit.

2. The apparatus according to claim 1,
   wherein the calculating unit calculates the exposure change amount on a underexposure side or an overexposure side relative to a correct exposure; and
   the determining unit determines that the autoexposure bracketing is to be performed in the case where the exposure change amount on the underexposure side or the overexposure side is greater than or equal to a first threshold and determines that the autoexposure bracketing is not to be performed in the case where the exposure change amount on the underexposure side or the overexposure side is less than the first threshold.

3. The apparatus according to claim 2,
   wherein in the case where the determining unit has determined that the autoexposure bracketing is to be performed, the shooting control unit captures at least one image at the correct exposure and captures at least one underexposed or overexposed image.

4. The apparatus according to claim 2,
   wherein in the case where the determining unit has determined that the autoexposure bracketing is not to be performed, the shooting control unit captures at least one image at the correct exposure.

5. The apparatus according to claim 1, further comprising a generating unit configured to generate a luminance histogram of the image metered by the photometry unit.

6. The apparatus according to claim 5,
   wherein the generating unit divides the image metered by the photometry unit into a plurality of blocks and generates the luminance histogram of the image using luminance values of the respective blocks.

7. The apparatus according to claim 5,
   wherein the determining unit determines that the autoexposure bracketing is to be performed based on peak values on a low-luminance side and a high-luminance side of the luminance histogram.

8. The apparatus according to claim 7,
   wherein the correcting unit calculates a correction value for correcting the exposure change amount using the peak values on the low-luminance side and the high-luminance side of the luminance histogram; and
   the correcting unit determines that the correction value is to be calculated in the case where the exposure change amount on the underexposure side or the overexposure side is greater than or equal to a second threshold and determines that the correction value is not to be calculated in the case where the exposure change amount on the underexposure side or the overexposure side is less than the second threshold.

9. The apparatus according to claim 7,
   wherein the calculating unit calculates the exposure change amount so that the peak values on the low-luminance side and the high-luminance side of the luminance histogram approach a predetermined luminance value in the autoexposure bracketing.

10. The apparatus according to claim 6,
    wherein the calculating unit calculates the exposure change amount so that an average luminance value in a low-luminance region or a high-luminance region of the luminance histogram approaches a predetermined luminance value in the autoexposure bracketing.

11. The apparatus according to claim 10, further comprising
    a detecting unit configured to detect movement in the apparatus itself or movement of the object in the image,
    wherein the correcting unit calculates a correction value only in the case where there is no movement in the apparatus itself or in the object in the image.

12. The apparatus according to claim 1, further comprising a display unit configured to display the image metered by the photometry unit,
    wherein the display unit does not display the image captured at the second exposure.

13. A control method of an image capturing apparatus which captures an image of an object, the method comprising:
    detecting a luminance of the object;
    determining, based on a result of photometry at a first exposure, whether to perform autoexposure bracketing that captures a plurality of images at different exposures;

calculating an exposure change amount that is different from the first exposure used when performing the autoexposure bracketing;

correcting the calculated exposure change amount based on a result of photometry at a second exposure that is different from the first exposure; and shooting an image at the exposure change amount calculated in the calculating step or the exposure change amount corrected in the correcting step.

14. A non-transitory computer-readable storage medium for storing a program to cause a computer to execute the control method according to claim 13.

* * * * *